March 26, 1957 L. B. LINDBECK 2,786,285
LAND LEVELING MACHINE
Filed Dec. 20, 1951 3 Sheets-Sheet 1
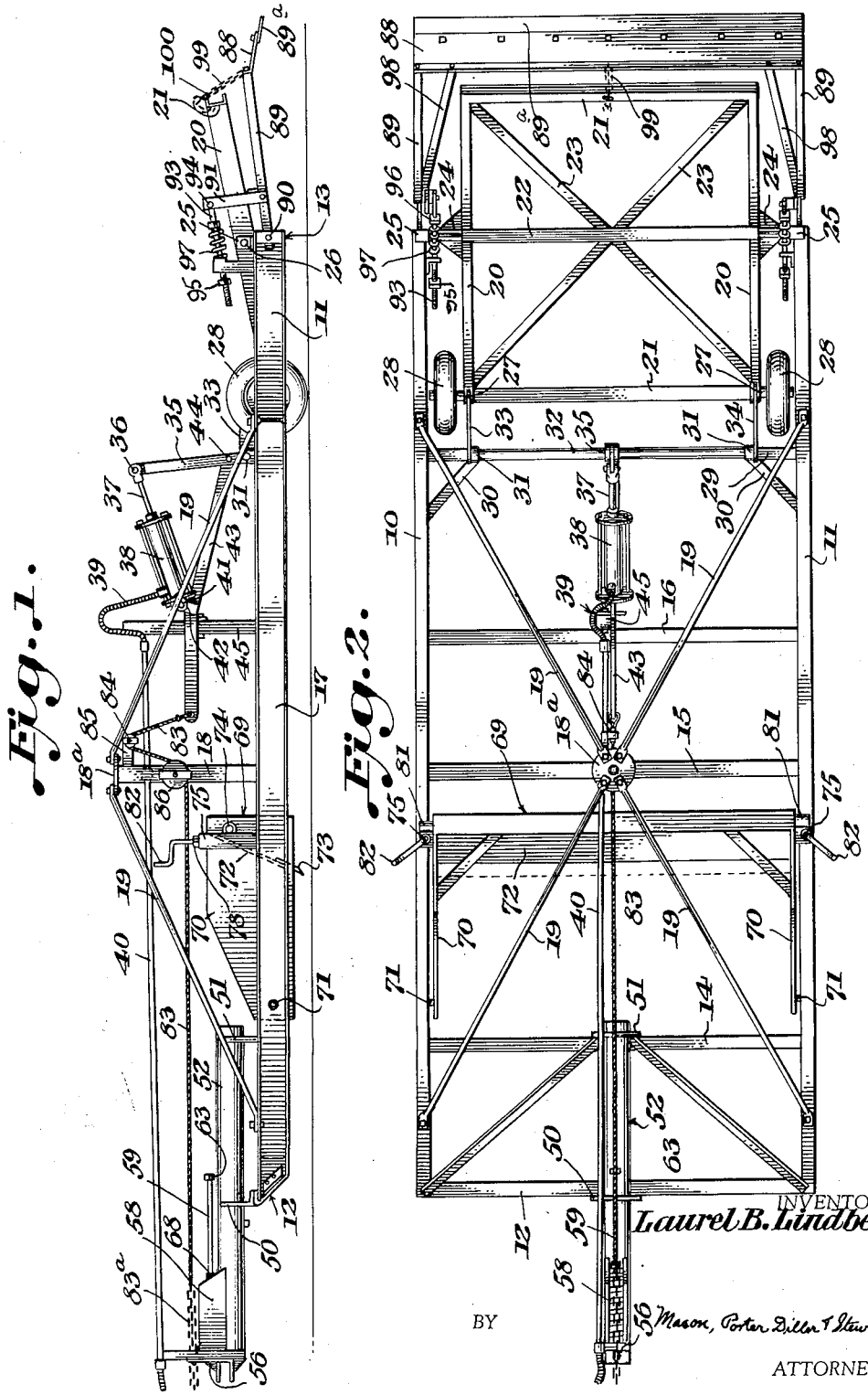
INVENTOR
*Laurel B. Lindbeck*
BY *Mason, Porter, Diller & Stewart*
ATTORNEYS March 26, 1957
L. B. LINDBECK
2,786,285
LAND LEVELING MACHINE
Filed Dec. 20, 1951
3 Sheets-Sheet 2
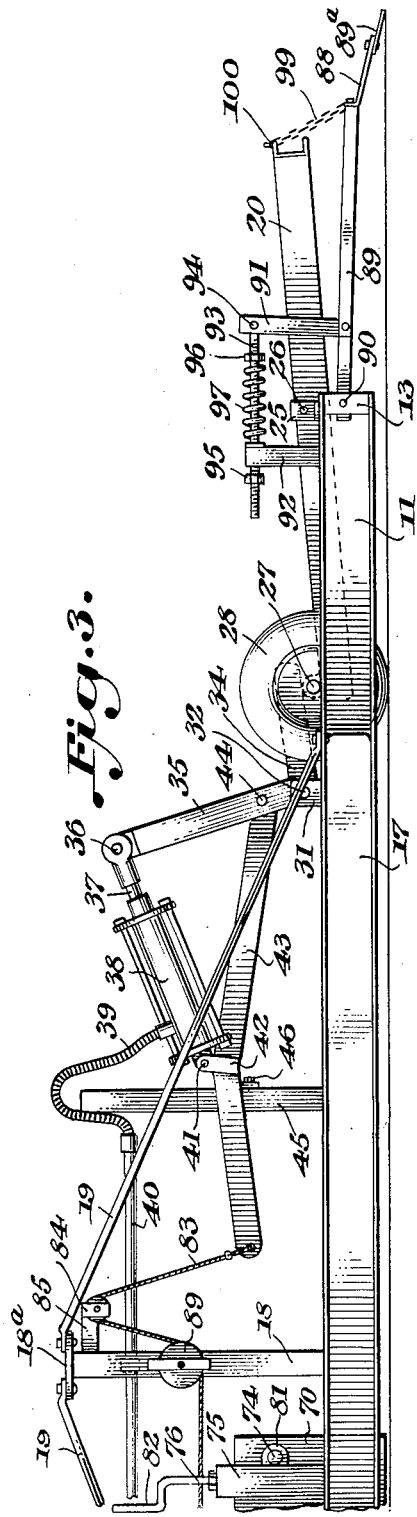
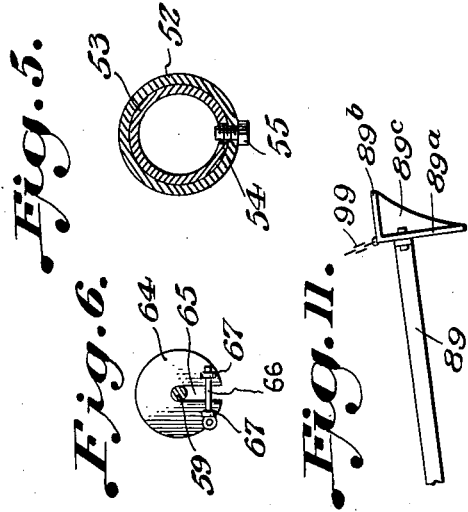
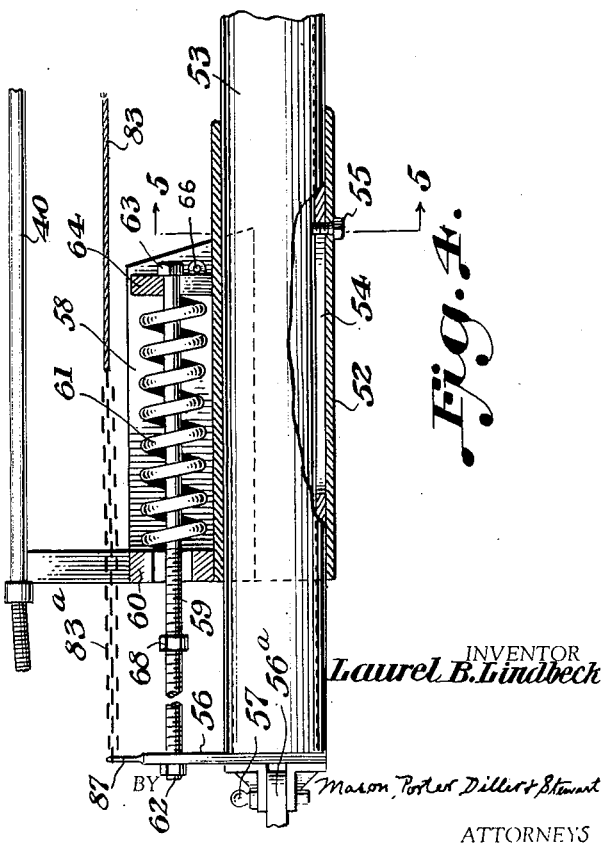
INVENTOR
Laurel B. Lindbeck
BY Mason, Porter, Diller & Stewart
ATTORNEYS March 26, 1957
L. B. LINDBECK
2,786,285
LAND LEVELING MACHINE
Filed Dec. 20, 1951
3 Sheets-Sheet 3
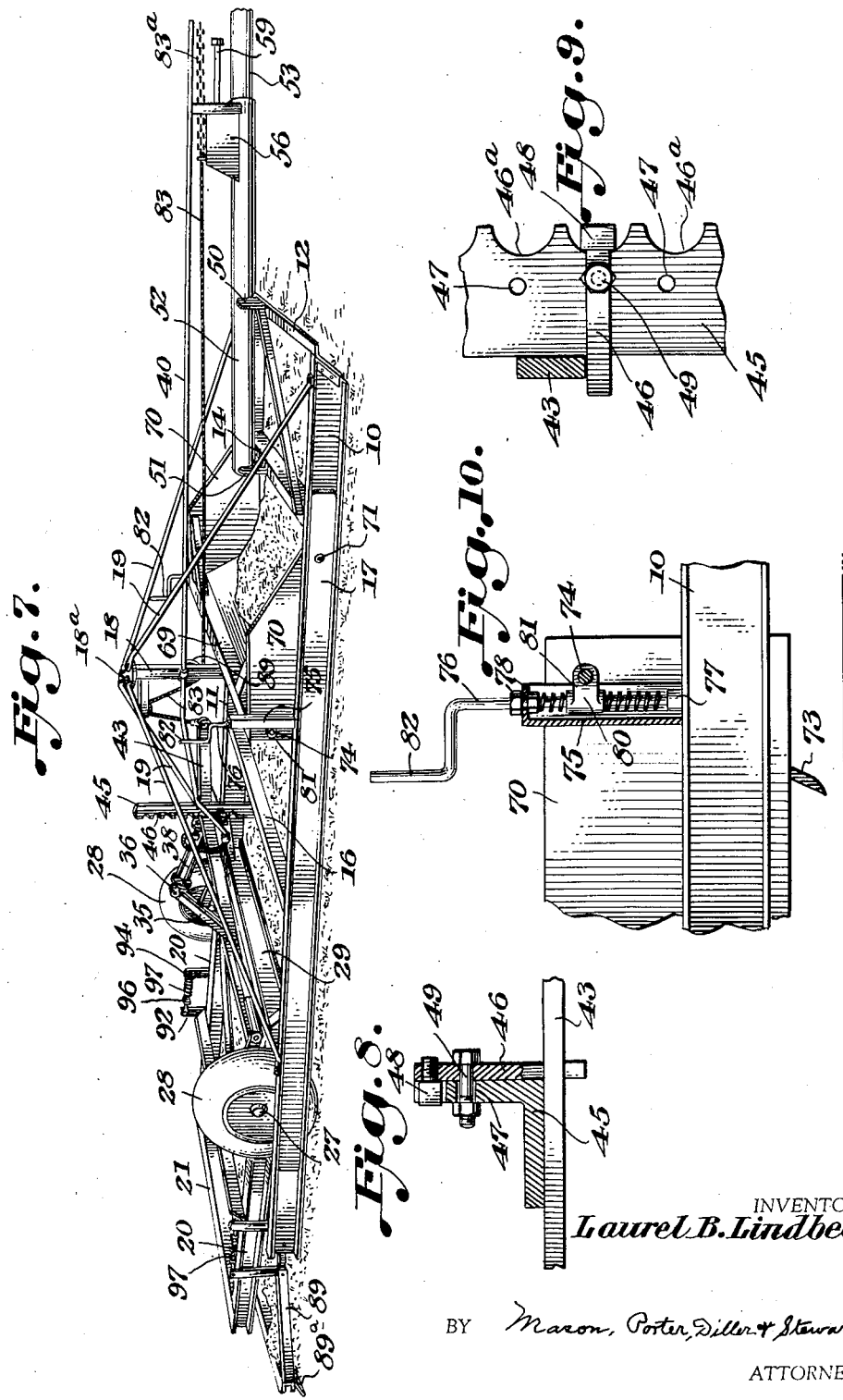
INVENTOR
*Laurel B. Lindbeck,*
BY *Mason, Porter, Diller & Stewart*
ATTORNEYS

United States Patent Office 2,786,285
Patented Mar. 26, 1957

2,786,285

LAND LEVELING MACHINE

Laurel B. Lindbeck, Las Cruces, N. Mex.

Application December 20, 1951, Serial No. 262,581

2 Claims. (Cl. 37—169)

The invention relates to new and useful improvements in a land leveling machine and more particularly a land leveling machine which may be attached to a tractor or other power actuated vehicle.

An object of the invention is to provide a leveling machine having a rigid frame structure mounted at the rear end thereof on ground wheels arranged so that the frame may be raised or lowered relative to said ground wheels, and a draft tongue connected to an adjustable hitch on the power actuated vehicle to which it is attached and wherein the frame structure has rigidly attached thereto intermediate its ends a land leveling scraper with the land engaging edge portion thereof projecting below the frame.

A further object of the invention is to provide a land leveling machine of the above type wherein the scraper is so mounted on the frame that it may be shifted to different set positions for varying the extent of projection of the scraper blade below the frame.

Another object of the invention is to provide a land leveling machine of the above type wherein a hydraulically operated mechanism is provided for raising and lowering the frame relative to the ground wheels.

Another object of the invention is to provide a leveling machine of the above type wherein means controlled by the draft pull will automatically raise the frame when the draft pull becomes excessive and will lower the frame when the draft pull decreases.

A still further object of the invention is to provide a leveling machine of the above type wherein the draft tongue can be adjusted as to length for positioning the frame at different distances from the vehicle to which it is attached.

A still further object of the invention is to provide a land leveling machine having a rigid frame structure mounted at the rear end thereof on ground wheels arranged so that the frame may be raised or lowered relative to said wheels and a draft tongue connected to an adjustable hitch of the power actuated vehicle wherein the main frame is provided with an automatic leveler or scraper disposed on said main frame midway between the wheels and the front end of the frame and with an auxiliary leveler at the rear end of said frame which is yieldingly pressed against the land during the operation of the leveler.

These and other objects will in part be obvious and will in part be hereinafter more fully described.

In the drawings, which show by way of illustration one embodiment of the invention:

Figure 1 is a side view of the improved leveling machine with the frame raised for transporting purposes;

Figure 2 is a plan view of the leveling machine shown in Figure 1;

Figure 3 is an enlarged view in side elevation of the rear portion of the frame and the parts associated therewith;

Figure 4 is a view in vertical section of the draft tongue and showing the telescoping sleeves and the parts associated therewith;

Figure 5 is a sectional view on the line 5, 5 of Figure 4;

Figure 6 is a side elevation of the abutment plate against which the compression spring bears;

Figure 7 is a perspective view of the land leveling machine showing the frame in lowered position and the machine operating to level the ground over which it is drawn;

Figure 8 is a sectional view showing the manner of detachably securing the cross iron to a post which cross iron serves as a rest for the lever associated with the mechanism for raising and lowering the frame;

Figure 9 is a view partly in side elevation showing the means for rigidly attaching the cross iron to the post;

Figure 10 is a view partly in section and partly in side elevation showing one of the jacks for raising and lowering the scraper blade; and Figure 11 is a view in side elevation showing a modified arrangement of ground contacting blade in the auxiliary leveler.

The improved land leveling machine includes a main frame which is substantially rectangular. Pivotally carried by the main frame is an auxiliary wheel frame. Pivotally mounted on one end of the wheel frame are wheel supporting arbors which are welded to the wheel frame and project outwardly. Wheels are mounted on these arbors and the wheel frame is dimensioned so that the wheels will lie inside of the line of the side frames.

Associated with the wheel frame is a lever mechanism which includes a shaft journaled in bearings carried by the side members of the frame. On the shaft are arms which project over the wheel frame and are adapted to bear on the wheel arbors which serve as fulcrums when the shaft is oscillated so that the frame will be raised or lowered relative to the arbors of the wheels. Rigidly attached to the shaft is a lever arm connected at its outer end to a hydraulic motor and the hydraulic motor at its other end is connected to an associated lever arm, which is pivoted to the first lever arm.

This associated lever arm rests on a cross iron carried by a post rigidly supported by one of the cross pieces of the main frame. When the associated lever is raised it will lift the main frame relative to the axis of the wheels and likewise the weight of the frame will press this associated lever arm into contact with the cross iron. Likewise, if the hydraulic motor is expanded it will move the main lever arm so as to raise the frame and when contracted the weight of the frame will lower it toward the ground.

Connected to the front end of the main frame is a draft tongue which is preferably formed of two telescoping tubular members. The inner tubular member is provided with a draft head which is connected to the usual adjustable hitch on a tractor. There is a compression spring which limits the telescoping movement of the draft tongue members and the draft pull of the tractor is transmitted to the main frame through this compression spring.

Mounted on the main frame between the wheels and the front end thereof is a scraper which cuts into the raised portions of the ground and conveys the same into the hollow places. This is the main leveler of the machine. Pivotally mounted on the main frame at the rear end thereof is a second auxiliary leveler frame with which is associated a spring mechanism which will force the second leveler into engagement with the ground. The main leveler is manually adjustable on the main frame so as to vary the depth of cut of the scraper blade forming a part thereof relative to the main frame.

There is also mechanism associated with the means for raising and lowering the main frame relative to the axis of the supporting wheels whereby the frame may be raised or lowered to decrease or increase the cutting position of the main leveler depending upon the draft pull of the tractor through the compression spring.

It is thought that the invention will be better understood by detailed description of the illustrated embodiment thereof. The main frame includes side members 10 and 11 which are connected at the front end by a cross member or plate 12. This cross member or plate is inclined and terminates in a forwardly extending ledge. This cross member, when the side members of the frame contact with the ground, assists in the leveling of the ground. The rear end of the main frame is connected by a cross member 13. Disposed between the front and rear ends of the frame are cross beams 14, 15 and 16. The side members of the frame are made from metal angle bars having flanges at the upper and lower faces thereof and disposed between the flanges, at the outside of the side members are plates 17 which are bolted to the side members for strengthening the same. Centrally of the cross beam is a post 18 which is rigidly attached to the cross beam. At the upper end of this post is a plate 18ª and extending from the plate 18ª to the side members are brace rods 19. These brace rods are welded or bolted to the upper flange of the side members. This provides a very rigid frame structure for the leveling machine.

Mounted between the side frames is a wheel supporting auxiliary frame consisting of side members 20, 20 and end members 21, 21. The side members 20, 20 are connected by a central cross beam 22. Extending from corner to corner of the wheel frame are cross braces 23, 23. This auxiliary wheel frame is provided with projecting bracket members 24, 24. The side frames are provided with bearing lugs 25, 25 and removable pivot pins 26 extend through the brackets and bearing lugs for pivotally connecting the auxiliary wheel frame to the main frame. Welded to the upper face of the auxiliary frame member 21 are wheel supporting arbors 27, 27. There is a wheel 28 mounted on each of the respective arbors.

A short distance in front of the wheels is a cross beam 29 with which is associated braces 30. Mounted on this cross beam are bearing lugs 31, 31 and located in the bearing lugs is a shaft 32. The shaft carries an arm 33 at one end thereof and an arm 34 at the other end thereof. These arms are rigid with the shaft and extend rearwardly over the front end member 21 of the wheel frame. In fact the arms bear on the arbors which support the wheels. Fixed to the shaft centrally thereof is a lever arm 35. The upper end of the lever arm 35 is pivoted at 36 to the piston rod 37 connected to a piston of the usual type in the cylinder 38. The cylinder and piston constitute a fluid operated motor to which fluid may be directed through the flexible pipe 39 connected to a pipe 40 which in turn is connected to the usual two-way valve so that fluid under pressure may be directed to the cylinder or exhausted therefrom. The other end of the hydraulic motor is pivoted at 41 to a lug 42 carried by an operating lever arm 43 which is associated with the lever arm 35, said arm 43 is pivoted at 44 between members of the lever arm 35.

The arm 43 moves up and down along the smooth face of a post 45. Normally the arm rests on a cross iron 46. The post 45 is rigidly attached to the cross beam 16. This post, as shown in Figs. 8 and 9 of the drawings, is formed of angle iron and the face along which the lever arm 43 is a smooth face. The other face of the angle iron is provided with notches or recesses at 46ª which are relatively closely spaced. This face of the angle arm is also provided with bolt holes 47. There is one bolt hole for each notch and it is disposed substantially on a line passing centrally through the notch. The cross iron has a projecting lug 48 secured thereto and this lug is adapted to be placed in one of the notches 46ª. A bolt 49 passes through the cross iron 46 and is disposed in the bolt hole associated with the notch containing the lug. This will rigidly support the cross iron in its horizontal position. The cross iron may be shifted from one notch to another by removing the bolt.

The wheels, of course, rest on the ground. The arms 33, 34 rest on the upper side of the wheel arbors. The weight of the main frame is carried by the shaft 32. The frame if it moves downward when these arms are resting on the arbors must necessarily cause the shaft to oscillate in a counter-clockwise direction as viewed in Figure 3. However, when the arm 43 rests on the cross iron the shaft cannot oscillate and therefore the frame will be supported in a position determined by the position of the cross iron on the post 45. If the hydraulic motor be extended by admitting fluid to the cylinder 38 it will shift the arm 35 in a clockwise direction relative to the arm 43 which will remain supported on the cross iron. This shifting of the arm 35 in a clockwise direction will lift the frame from the ground and when the cylinder is contracted and the arm moved in a counter-clockwise direction it will lower the frame.

Rigidly attached to the front member 12 of the main frame is a supporting bracket 50. Attached to the cross frame 14 is a supporting bracket 51. The draft tongue is made in two sections, an outer sleeve section 52 and an inner telescoping section 53. This outer sleeve section 52 is welded to the supporting brackets 50 and 51. The inner telescoping section 53 is provided with a slot 54. A bolt 55 carried by the outer sleeve section 52 extends into said slot. The bolt may move along the slot permitting the outer sleeve member to move back and forth on the inner telescoping member but prevents one member from rotating relative to the other.

Mounted on the end of the inner telescoping member is a draft head 56. This draft head 56 is connected to the draw bar 56ª of the hitch on the tractor. The connection is made through a coupling pin 57. Mounted on the outer end of the outer sleeve 52 is a housing 58. A rod 59 extends through the front end 60 of this housing. Disposed within the housing is a compression spring 61. The rod extends through the draft head 56 and has an adjustable nut 62 which secures the rod to the draft head. The rod extends through the compression spring and on the other end of the rod is a hex nut 63. An abutment plate 64 is provided with a radial slot 65. This abutment plate is adapted to be slipped down over the rod 59 and the spring bears against said abutment plate and the abutment plate in turn bears against the hex nut 63. A cotter pin 66 extending through lugs 67, 67 serves to retain the abutment plate on the rod.

The draft pull on the inner sleeve 53 is transmitted to the rod 59 and the rod transmits the draft pull through the compression spring 61 to end member 60 of the housing 56 which is rigidly welded to the outer sleeve section 52. It will be noted that the leveling machine is drawn over the ground through this compression spring connection between the movements of the telescoping sections of the draft tongue.

Mounted on the rod 59 is an adjustable hex nut 68. It is sometimes expedient to shorten the distance between the tractor and the leveling machine and this may be accomplished by removing the cotter pin 66 and then the abutment plate 64 and then moving the inner telescoping section into the outer sleeve section 52. The abutment plate 64 is then placed in front of the hex nut 68 as clearly shown in Figure 1 of the drawing. The slot 54 is of sufficient length to permit this telescoping of the inner member 53 into the outer member 52. In this position of the parts the nut 68 will transmit the draft pull to the abutment plate 64 and through the compression spring to the outer section of the draft tongue. From the above it will be noted that the main frame of the leveling machine is supported by the wheels 28, 28 disposed adjacent the rear end of the main frame and by the draft tongue which is secured to the ordinary hitch of the tractor. By the mechanism described including the fluid motor, the frame may be raised and lowered at the rear end thereof relative to the wheels and through the adjustable hitch to the tractor the draft tongue may be raised or lowered and this will raise or lower the front end of the frame.

Mounted on the main frame in front of the center post 18 is a main leveler 69. Said leveler includes side plates 70, 70 pivoted at 71, 71 to the side frame members respectively. Extending across the rear portion of the leveler is a heavy plate forming a back wall 72 which inclines rearwardly so as to form in effect a bottomless scraper bowl. This heavy plate is welded to the side members and it extends rearwardly so as to strengthen the scraper. At the lower edge of the back wall of the leveler is a cutting blade 73 which projects below the side walls. The scraper at the rear end thereof is supported by the side frames through adjustable jacks. Welded to the side frames are projecting lugs 74. Adjacent the lugs 74 is a vertical jack housing 75 which is welded to the side members 10. There is a jack at each side of the scraper and they are of like structure. Mounted in the housing of the jack is a shaft 76 which is journaled in a bearing 77 at the lower end thereof. The housing has a top flange through which the shaft 76 extends. There are collars 78 welded to the shaft above and below the top plate which prevents the shaft from endwise movement. The shaft carries a spiral thread 79. A sleeve 80 engages the thread 79 on the shaft and this sleeve carries a projecting member 81 having a bore to receive the lug 74. Each shaft has a crank handle 82 whereby the shaft may be turned for raising and lowering the sleeve 80 and thus raising or lowering the rear end of the leveler. This will adjust the position of the blade 73 relative to the frame. The frame is raised or lowered in order to vary the extent to which the scraper blade will cut into high points of the ground, scraping the material therefrom and transporting it into lower levels or depressions so that the land is reduced to a substantially common level.

Attached to the lever arm 43 is a cable 83 which runs over a pulley 84 carried by a supporting bracket 85 located at the upper end of the post 18. Also mounted on the post is another pulley 86 over which the cable runs. This cable extends all the way to the draft head 58 mounted on the inner telescoping section 53 of the draft tongue. Attached to the end of the cable which terminates short of the draft head is a chain 83a consisting of links any one of which may be placed over a lug 87 carried by the draft head 56. When the telescoping sections are in what might be called closed position then a link is placed over the lug 87 so as to take slack out of the cable when the arm 43 is resting on the cross iron 46. Assuming that the parts are in the position shown in Figures 3 and 7 with the main frame substantially contacting the ground this scraper blade will cut into raised sections of ground and if the depth of cut places an undue drag on the leveler the spring 61 will be compressed and this will allow the inner telescoping member 53 of the draft tongue to move outward of the sleeve 52 and as the draft head moves away from said sleeve 52 there will be a pull on the cable 83. This pull on the cable 83 will lift the lever arm 43 off from the cross iron and as the lever arm 43 is raised the frame will be raised due to the oscillation of the shaft 32 and the pressure of the arms 33, 34 on the axles of the carrying wheels. If the draft pull on the leveler decreases then the spring will be expanded to a limited extent and the cable released sufficiently to allow the lever arm 43 to move back on to the cross iron. Thus it is that as the draft pull increases the frame and the scraper fixed thereto will be raised and the depth of cut decreased and when the draft pull decreases then the frame will return to its normal position for a full depth of cut or leveling.

The main frame can also be raised or lowered through the control of the fluid under pressure directed to the hydraulic cylinder 38. If fluid is admitted to the lower end of the cylinder 38 then the piston will be forced outwardly swinging the lever arm 35 in a clockwise direction and this will lift the frame. On the other hand if the frame is lifted and the fluid line is connected to the exhaust then the weight of the frame and associated parts will swing the lever arm 35 in the opposite direction and the frame will move downward toward the ground.

At the rear end of the main frame is a second leveler which consists of a heavy plate 88 having a wear plate 89a extending across the lower edge portion of the plate 88. This plate 88 which is a leveler or smoothing plate and constitutes the second level is carried by arms 89, 89 which are pivoted to the main frame at 90. Welded to the arm 89 is an upstanding post 91. Mounted on the frame is a rigid upstanding post 92. A rod 93 pivoted at 94 to the post 91 extends through the post 92. This rod is threaded and carries on its outer end a hex nut 95. It also has a hex nut 96 threaded thereon. Between the hex nut 96 and the post 92 is a spring 97. Between the arms 89 and the plate 88 are braces 98. A chain 99 is attached to the plate 88. This is a link chain and one of the links may be slipped over a stud 100 on the rear member 21 of the wheel frame. This is for the purpose of holding the leveler raised to an inoperative position.

In Figure 1 of the drawings the supporting frame is shown in raised position for transporting the leveling machine from one location to another. The main leveling device 69 has a fixed position on the frame and when the frame is raised this scraper or leveling device will be raised with it. An auxiliary leveling device 89 at the rear of the frame is held in raised position by the chain 99. It will be noted from this figure that the hydraulic motor has been extended and the lever 35 swung in a clockwise direction relative to the lever 43. This causes the arms 33 and 34 to press on the axles of the ground wheels and lift the frame from the ground. The hitch on the tractor is also adjusted so as to raise the draft tongue and this will raise the frame.

When it is desired to use the machine as a leveler then the front end of the main frame is lowered by manipulating the hitch to the tractor and fluid is exhausted from the motor so that the piston will move inwardly in the cylinder 38 and this will lower the frame to a position adjacent the surface of the land and in contact with the land if so desired. The leveling or smoothing device 89 is then lowered until it contacts with the ground and the springs 97 will yieldingly press the smoothing device into contact with the ground. When during a leveling operation the scraper blade 73 is cutting too deeply into the ground so as to cause excessive draft pull the spring 61 will be compressed as it is through this spring that the draft pull is conveyed from the inner telescoping portion of the draft tongue 53 to the outer sleeve 52 of the draft tongue. This movement which compresses the spring will exert a pull on the cable 83 which is connected to the draft head on the inner telescoping part of the draft tongue. The pull on the cable will lift the lever arm 43 and this, through the hydraulic motor, will shift the lever arm 35 so as to raise the frame and thus decrease the depth that the scraper blade cuts into the ground. When the draft pull decreases the lever arm 43 will move back against the cross iron 46.

If desired, the cross iron can be detached and placed in any one of the notches desired and this will determine the extent to which the frame may be lowered relative to the ground wheels.

In Figure 11 there is shown a slightly modified form or arrangement of the ground contacting blade of the auxiliary leveling device. Bolted to the cross bar connecting the arms 89, 89 at opposite sides of the leveler is a steel plate 89a which is substantially perpendicular to the earth when contacting therewith. This plate 89a will cut into the earth and serve as a leveler as well as a smoother. In order to reenforce this plate 89a there is a flange 89b extending across the upper edge of the plate 89a and there are webs 89c welded to the flange and to the plate. This second leveler makes it possible to level the ground to the very edge of the field. The operator may back the leveler up into the corner and begin leveling right from the very corner rather than from the first leveling blade which is several feet from the second leveler.

It is obvious that many changes may be made in the details of construction without departing from the spirit of the invention as set forth in the appended claims.

I claim:

1. A land leveling machine comprising an elongated rigid frame having spaced side members, a wheel supporting frame disposed between said side members adjacent the rear end of the frame, means for pivotally connecting said wheel supporting frame to the side members at points intermediate the ends of the wheel supporting frame, wheel axles welded to said wheel supporting frame at the front end thereof, ground wheels mounted on said axles, a shaft journaled on said side members and disposed a short distance in front of said wheel axles, arms rigidly attached to the shaft and adapted to bear respectively on said wheel axles, a lever arm rigidly attached to said shaft, a second lever arm pivotally attached to said first named lever arm, a hydraulically operated motor having a piston rod connected to one of said lever arms, and a cylinder connected to the other of said lever arms, a post rigidly carried by said frame, a cross iron mounted on said post on which said second lever arm normally rests whereby the extending of the piston rod by fluid pressure admitted to the cylinder will swing the first named lever arm thereby causing the arms carried by said shaft to press against the axles as fulcrums and raise the frame.

2. A land leveling machine comprising an elongated rigid frame having spaced side members, a land leveling scraper fixed to said frame intermediate the ends thereof with the scraper projecting below the frame, a wheel supporting frame disposed between said side members adjacent the rear end of the frame, means for pivotally connecting said wheel supporting frame to the side members at points intermediate the ends of the wheel supporting frame, wheel axles welded to said wheel supporting frame at the front end thereof, ground wheels mounted on said axles, a shaft journaled on said side members and disposed a short distance in front of said wheel axles, arms rigidly attached to the shaft and adapted to bear respectively on said wheel axles, a lever arm rigidly attached to said shaft, a second lever arm pivotally attached to said first named lever arm, a hydraulically operated motor having a piston rod connected to one of said lever arms, and a cylinder connected to the other of said lever arms, a post rigidly carried by said frame, a cross iron mounted on said post on which said second lever arm normally rests, a draft tongue including an outer tubular member rigidly attached to the frame, and an inner tubular member telescoping within the outer member and connected to the hitch of a tractor, a compression spring for transmitting the draft pull on the inner tubular member attached to the tractor of the outer tubular member, a cable attached to said second lever arm, said cable running over pulleys on the frame and connected at its outer end to said inner telescoping member whereby when excessive pull is exerted on the compression spring and the inner tubular member moves relative to the outer tubular member, said cable will be pulled upon and thus the second lever arm raised from the cross iron, the shaft oscillated and the frame thus raised so as to automatically raise the frame and the scraper carried thereby.

References Cited in the file of this patent

UNITED STATES PATENTS

| | | |
|---|---|---|
| 987,696 | Cairncross | Mar. 28, 1911 |
| 1,273,069 | Keckritz | July 16, 1918 |
| 1,590,702 | Scott | June 29, 1926 |
| 1,777,487 | Goodwill | Oct. 7, 1930 |
| 2,002,431 | Church | May 21, 1935 |
| 2,021,660 | Gledhill et al. | Nov. 19, 1935 |
| 2,208,526 | Gurries | July 16, 1940 |
| 2,283,744 | Lethlean | May 19, 1942 |
| 2,325,025 | Allen | July 27, 1943 |
| 2,349,130 | Allen | May 16, 1944 |
| 2,351,830 | Mitchell et al. | June 20, 1944 |
| 2,422,530 | Court | June 17, 1947 |
| 2,595,289 | Peterson | May 6, 1952 |